United States Patent Office 3,455,721
Patented July 15, 1969

3,455,721
COLOR SENSITIZED RECORD MATERIAL COMPRISING PHENOLIC RESIN AND ACID TYPE MINERAL
Paul S. Phillips, Jr., and Gerald M. Hein, Dayton, Ohio, assignors to The National Cash Register Company, Dayton, Ohio, a corporation of Maryland
No Drawing. Filed Dec. 21, 1964, Ser. No. 420,193
Int. Cl. B41m 5/12; D21h 1/28
U.S. Cl. 117—36.2                              13 Claims

ABSTRACT OF THE DISCLOSURE

The invention provides a record material sensitized with interspersed microfine solid particles of acid-reacting oil-soluble polymeric material, preferably a phenolic polymer, and microfine solid particles of an acid-reacting mineral, preferably kaolin clay; the polymeric material forming a distinctive mark upon application of a basic chromogenic material, usually dissolved in an oil, and the mineral providing a site for reaction of a second chromogenic material which produces its distinctive mark over a period of time.

This invention relates to a record member sensitized with microfine color-reactant particles of different kinds that are distinguished in one way by their chemical reaction characteristics and in another way by their solubility characteristics. The invention also relates to a composition for sensitizing the record member.

The record member consists of a base sheet or web member either of fibrous construction, such as paper, or of continuous structure, such as films, of organic polymeric material, carrying the color-reactant particles in an exposed state with respect to applied ink. The particles are arranged in intimate juxtaposition to form an apparently unbroken ink-receptive surface, yet substantially each particle individually is available for contact with applied ink. While the record member is adapted to receive any kind of ink, whether colored or colorable, its special utility is its use with an oily ink which is normally colorless and carries in liquid solution a colorless chromogenic reactant for each of at least two of the particle kinds, each kind of chromogenic material having the property of becoming colored upon contact of its solution state with its associated kind of particle. All of the particles are insoluble in water; however, at least one kind of particle is soluble in the oily ink, and at least one other kind of particle is insoluble in the oily ink. At least one of the kinds of chromogenic reactant material of the special ink undergoes an acid-base reaction with its paired kind of particle when and where applied to the novel record member to produce a distinctively colored mark, and at least another of the kinds of chromogenic reactant material, when and where applied, undergoes hydrolysis followed by an oxidation-reduction reaction to produce its distinctive color. As the two chromogenic materials are both applied to the same areas, their color will be a blend of their individual hues. While in its simplest form the invention can be carried out by using just two kinds of particle reactants, typified by acid-reacting oil soluble phenolic polymeric material and kaolin, in some cases, for which examples will be given, supplementary kinds of reactants may be added for additional properties which it is desired to have present in the record member, and these added properties may be physical or chemical.

The whole utilitarian purpose of providing the novel sensitized record member has many facets, all contributing to the fuller commercial acceptance of color-reactant recording systems by reason of lower cost, wider utility, and better performance. Color-reactant recording systems are so called because the reactant chromogenic material content of the ink used in such systems is substantially colorless and assumes a color when applied to a specially-sensitized recording surface, some of the chromogenic material coloring at once and some coloring on prolonged contact with the associated particulate material. This invention, when the composition is applied as a coating to paper or incorporated therein as a filler, provides a record member with such specially-sensitized recording surface which also is distinguished in use for regular colored oily-ink reception because it utilizes a paper-coating or paper-loading material which is well recognized as improving the printing quality of paper and at the same time acts as one of the reactants. Thus the sensitized sheet can be printed on at one time with regular printing inks and at another time at another place with the colorless ink.

As distinguished from pigment inks, the chromogenic material in the colorless ink of these systems is in the nature of a colorless dye or combination of dyes that assume, through chemical reaction, a visually distinctive color when undergoing reaction with the particulate particles on the sheet. In one form of use of the sheet which is the subject of the invention, the chromogenic reactant in colored form is blended in the applied ink with an already colored dye component, so that the ink makes one color, the color of the colored dye component, on an unsensitized record sheet and a blend of colors of the colored dye and the reacted colorless component on a sensitized record sheet. This kind of ink is disclosed in United States Patent No. 2,714,074, which issued July 26, 1955, on the application of Barrett K. Green.

For most recording purposes, it is essential from a commercial standpoint that a distinctively colored mark make prompt appearance on the application of the colorless ink to the recording surface, to produce a visible representation of whatever is meant to be recorded; that the color be of distinctive hue but also of high intensity; and that the mark remain colored for a long period of time consistent with the objective of permanent recording. The well-known infirmities of colored dyes as regards permanence relate to light-fading, thermal fading, and molecular rearrangements and disintegrations of various kinds in which part or all of the visually perceptible color is lost. It is an object of the invention to overcome, as far as possible, the loss of color in the color-reactant marks which are occasioned by passage of time, by exposure to environment, or by intentional chemical or physical attrition or obliteration.

During the last decade, one of the most prominent of such colorless recording systems utilized a multiple coloring principle in which an oily ink having two types of chromogenic reactants, normally colorless, was used on an ink-receiving sheet sensitized with substantially insoluble acid-like materials of high surface activity, such as attapulgite and zeolite material. As the normally colorless chromogenic material content of inks used therewith, the most outstanding are Crystal Violet Lactone and Benzoyl Leuco Methylene Blue, both of which in the colored form have intense hues in the blue end of the visual spectrum band. Such a system is disclosed in United States Letters Patent No. 2,712,507, which issued July 5, 1955, on the application of Barrett K. Green, and pertains to a construction in which the ink is applied from an oversheet by pressure-release from microscopic capsules. This system is now in world-wide use and commands a predominant position in the field of colorless recording systems, and its continued use is expected. It employs only insoluble particulate material to cause coloration in applied inks, the coloration of Crystal Violet Lactone being developed by an electron donor-acceptor solid-surface reaction with acid clay-like material, and the coloration of the Benzoyl Leuco Methylene Blue being brought about first by hydrolysis followed by an oxidation-reduction reaction which takes hours to complete on the same material. Due to the characteristics of the chemical and physical mechanism involved, the color produced in Crystal Violet Lactone brought about by the solid-surface electron donor-acceptor reaction is immediate, but the color so produced fades in light in a matter of days or hours, depending on the total energy of the light to which the marks are subjected, and the color may be extinguished in these Crystal Violet Lactone marks by other applied materials which are preferentially adsorbed by the attapulgite or zeolite materials and, having no color of their own, cause disappearance of the marks because of the reversion of Crystal Violet Lactone to its colorless state. This leaves a hiatus potential in the continuity of existence of the recorded data marks should such Crystal Violet Lactone coloration prematurely disappear before being supported by the coloration of the Benzoyl Leuco Methylene Blue. Under conditions of immediate and constant hourly or daily resort to the records of the solid-surface reaction system employing Crystal Violet Lactone and surface-active minerals of the attapulgite kind, in daylight or strong artificial light, no temporary disappearance of the record data is tolerable. Using the same chromogenic materials, Crystal Violet Lactone and Benzoyl Leuco Methylene Blue, for their superb coloring properties, the reaction with the sensitizing non-chromogenic materials of this invention provides, immediately, marks having a new color persistence combination because the oil-soluble particles react with the Crystal Violet Lactone to produce a color by an acid-base reaction in which both components are in solution, the color being more permanent because its colored form by that reaction is substantially resistant to light fading and is not dependent for its color on adsorption on a solid surface-active material.

There are other factors which give the novel record sheet a superiority for inks of multiple colorless chromogenic content, and these are listed for convenience:

(1) The solution formation of the solid particles of polymeric material in the same oily liquid solvent with the associated colorless dye allows penetration of the color into the support sheet, if porous, like paper, so that the liquid-solution-colored form of the chromogenic material sinks into the body of the sheet and is not merely on the surface of the sheet, where the particles originally rested. This feature protects against erasure of recorded data by attrition of the surface of the record sheet and protects, to some extent, against the effect of applied erasing liquids. It is to be noted that, if desired, the solvent of the applied ink may be evaporable.

(2) There is no problem of the poisoning of the particulate reactants by airborne contaminants, as the reactants are not highly surface-active, as is the case with attapulgite and zeolite particles. Record sheets made with surface-active materials are subject to environmental desensitization.

(3) The reactant particles need be supplied only in minimum calculable amounts because there is no unpredictable loss of effectiveness by environmental desensitization, to which reference was made above, and, hence, no safety factor in the way of additional material need be provided. This permits greatly reduced coating weight of sensitizing material per unit area to be used, over what has heretofore been required to insure that the commercial product has adequate storage life before it is used.

(4) Whereas in the past the practice of using surface-active minerals has resulted in serious rheological problems with aqueous coating compositions because such minerals naturally produce extraordinarily viscous slurries and because excessive amounts were used to offset air contamination, the polymeric material particles, on the other hand, have no such tendency to create extraordinary viscosity. In this respect, if air contamination is not a problem, the attapulgite, as has been used, need not be completely replaced by the acid polymeric material, but only in so far as is desirable to overcome any coating difficulty caused by the use of the formerly-necessary excessive quantities of attapulgite and any performance difficulty caused by fading and de-sorption.

(5) The kaolin gives the coating a superior smoothing behavior as a paper-loading agent as compared with attapulgite, and is renowned for its characteristics in providing a superior writing surface for the reception of oily inks.

(6) The kaolin and the organic polymeric materials used in practicing this invention are not particularly abrasive to paper-handling and paper-printing machinery, as has been the experience with the use of large amounts of the more abrasive attapulgite.

(7) The invention provides an important reduction in cost of reactant materials, first, because of reduction of the amounts which it is necessary to use, and, second, because of a reduction in shipping costs of finished record material due to lighter overall weights of coating materials per unit of recording area.

(8) The novel coating composition in adequate amounts may be applied by a size press mechanism on the paper-making machine, whereas attapulgite coatings of equivalent performance are difficult to use that way because of the high viscosities involved. The same is true of some other coating devices, such as the trailing-blade coating device.

The eligible polymeric materials of sufficient activity in an acid sense and suitable for use in this invention because they are oil-soluble have been disclosed in an application for United States Letters Patent, Ser. No. 392,404, filed Aug. 27, 1964, now abandoned, by Robert E. Miller and Paul S. Phillips, Jr., the latter being one of the applicants herein, the invention claimed in that application being directed not to a sheet of record material sensitized with oil-insoluble acid minerals and polymeric material adapted to color applied ink, but to a pressure-sensitive system of oil-soluble acid polymeric material, colorless color reactant, and capsule- or film-isolated solvent liquid situated either together on one sheet or in a couplet of sheets, all of the reactant components being soluble. In this present invention, both oil-soluble and oil-insoluble non-chromogenic solid particles are used, and there is no isolated solvent therein, except that oil-dissolved inks may be applied in any manner to the coating particles as such but not to dissolve all reactants, and, if desired, the ink may be used encapsulated.

Among the oil-soluble organic polymeric materials suitable for use in this invention together with appropriate ink solvents to be used therewith, certain phenol-aldehyde and phenol-acetylene polymers, maleic acid-rosin resins, partially or wholly hydrolyzed styrene-maleic anhydride copolymers and ethylene-maleic anhydride copolymers, carboxy polymethylene (Carbopol 934), and wholly or partially hydrolyzed vinyl methyl ether-maleic anhydride copolymer are specified as typical of the reactive acidic polymeric materials.

Among the phenol-aldehyde polymers found useful are members of the type commonly referred to as novolacs, which are characterized by solubility in common organic solvents and which are, in the absence of cross-linking agents, permanently fusible. Another group of useful phenol polymeric materials are alkylphenol-acetylene resins, likewise soluble in common organic solvents and possessing permanent fusibility in the absence of being treated by cross-linking materials. Generally, the phenolic polymer material useful in practicing this invention is characterized by the presence of free hydroxyl groups and the absence of groups, such as methylol, which tend to promote infusibility or cross-linking of the polymer, and by their solubility in organic solvents and relative insolubility in aqueous media.

Resoles, if they are still soluble, may be used, though subject to change in properties upon aging.

A laboratory method useful in the selection of suitable phenolic resins is a determination of the infra-red absorption pattern of a candidate material. It has been found that phenolic resins showing an absorption in the 3200–3500 cm.$^{-1}$ region (which is indicative of the free hydroxyl groups) and not having an absorption in the 1600–1700 cm.$^{-1}$ region are suitable. The latter absorption region is indicative of the desensitization of the hydroxyl groups and consequently makes such groups unavailable for reaction with the chromogenic materials to be specified.

The preparation of the phenolic-formaldehyde polymeric materials suitable for practicing this invention is described in "Industrial and Engineering Chemistry," volume 43, pages 134 to 141, January 1951; a particular polymer thereof is described in Example 1 of United States Patent No. 2,052,093, issued to Herbert Hönel on Aug. 25, 1936; and the preparation of the phenol-acetylene polymers is described in "Industrial and Engineering Chemistry," volume 41, pages 73 to 77, January 1949.

The preparation of the maleic anhydride copolymers is described in the literature, such as, for example, one of the maleic anhydride-vinyl copolymers, as disclosed in the publication "Vinyl and Related Polymers," by Calvin E. Schildknecht, second printing, published April 1959 by John Wiley & Sons, Incorporated. See pages 65 to 68 (styrene-maleic anhydride copolymer), pages 628 to 630 (vinyl methyl ether-maleic anhydride copolymer), and pages 530 to 531 (ethylene-maleic anhydride copolymer).

The liquid solvent of the ink used must be capable of dissolving the mark-forming chromogenic components. The solvent may be volatile or non-volatile, and a single or multiple component solvent may be used which is wholly or partially volatile. Examples of volatile solvents useful with the basic chromogen-acidic polymer mark-forming components are toluene, petroleum distillate, perchloroethylene, and xylene. Examples of non-volatile solvents are high-boiling-point petroleum fractions and chlorinated diphenyls.

Generally, the solvent chosen should be capable of dissolving at least 1%, on a weight basis, of the basic chromogenic material, preferably in excess of 2%, and a larger amount of polymeric material—up to, say, 15 or more percent—to form an efficient reaction. However, in the preferred system, the solvent should be capable of dissolving an excess of the polymeric material, so as to provide every opportunity for utilization of the chromogenic material and thus to assure the maximum coloration at a reaction site.

A further criterion of the solvent is that it must not interfere with the mark-forming reaction. In some instances, the presence of the solvent may interfere with the mark-forming reaction or diminish the intensity of the mark, in which case the solvent chosen should be sufficiently vaporizable to assure its removal from the reaction site after having, through solution, brought the mark-forming components into intimate admixture, so that the mark-forming contact proceeds.

Colorable by the specified polymeric materials are a large number of basic dyes which also are disclosed in the above-mentioned Miller and Phillips United States patent application, such being diaryl phthalides; leucauramines; acyl auramines; α,β-unsaturated aryl ketones; basic mono azo dyes; Rhodamine B Lactams such as N-(p-nitrophenyl) Rhodamine B Lactams; polyaryl carbinols; and 8'-methoxy benzoindolinospiropyrans, which may be identified as (8'-methoxy BIPS). Illustrative compounds of each group are diaryl phthalides: 3,3-bis(p-dimethylaminophenyl)-6-dimethylaminophthalide (Crystal Violet Lactone); and 3,3-bis(4-dimethylaminophenyl) phthalide (Malachite Green Lactone); leucauramines: the N-halophenyl derivatives of leucauramine disclosed in United States Letters Patent No. 2,828,341, issued to Clyde S. Adams, Marjorie J. Cormack, and Mary Lou Frazier on Mar. 25, 1958; and the N-alkylhalophenyl derivatives of leucauramine disclosed in United States Letters Patent No. 2,828,342, issued to Clyde S. Adams and Marjorie J. Cormack on Mar. 25, 1958, said patents being incorporated by reference herein, particularly N-(2,5-dichlorophenyl) leucauramine; acyl auramines: N-benzoyl auramine; and N-acetyl auramine; α,β-unsaturated aryl ketones: dianisylidene acetone; dibenzylidene acetone; and anisylidene acetone; basic mono azo dyes: p-dimethylaminoazobenzene-o-carboxylic acid (Methyl Red); 4-aminoazobenzene (Oil Yellow AAB); and 4-phenylazo-1-naphthylamine; Rhodamine B Lactams: N-(p-nitrophenyl) Rhodamine B Lactam; polyaryl carbinols: bis(p-dimethylaminophenyl) methanol, called Michler's Hydrol; Crystal Violet Carbinol; and Malachite Green Carbinol; 8'-methoxy BIPS: 8'-methoxy benzoindolinospiropyran; 4,7,8'-trimethoxybenzoindolinospiropyran; and 6'-chloro, 8'-methoxybenzoindolinospiropyran; and the compound p-dimethylaminostyryl quinoline.

In the base-acid color system, as stated above, the polymeric mark-forming component(s) chosen must be acidic relative to the basic chromogenic compound and reactive with the chromogenic material to effect distinctive color formation or color change.

Kaolin is generally known and used in the paper-making industry as "China clay" and is outstandingly preferable as the particulate oil-insoluble and water-insoluble material of acid characteristics necessary to color benzoyl leuco methylene blue. A white kaolin is used, and, because of its whiteness, its plate-like particle form, which gives it unparalleled coating properties in aqueous slurries, its universal abundance in supply, its historical general usage in the paper-making and paper-converting industries, and its low cost, it is an ideal material. Of course, there are many other materials of a mineral nature which can be used instead of and matched against kaolin clays as the standard of perfection. Other types of particulate and substantially colorless water- and oil-insoluble minerals of the necessary acid properties are deemed equivalents of kaolin, some being bentonites, although not so good as kaolin from a rheological standpoint.

From the foregoing choice of materials, a number of different specific compositions on a dry basis may be made, and these may then be used as desired, as being made into an aqueous slurry to be coated on a finished paper sheet, to be applied to a wet sheet of paper in the formative state in any desired manner, or made a part of the paper furnish from which a paper sheet is made, or on the other hand applied as a dispersion coating to a continuous film-like web such as synthetic organic polymeric material made into record sheets, bands, or strips, or to any record support material surface, all coming within certain limits merely set as practical and not set for any chemical or physical reason. In general, so as to be economical, the materials should be used in just sufficient quantities to make useful records for the purpose in view, and this relates to criteria of the factors of intensity, definition, color, and a great many other factors with regard to the characteristics of the base web material, the characteristics of the ink to be applied, and the environment of use, all of which come within the paper manufacturers' and printers' skill and general knowledge and are not deemed to be of inventive or operative significance, but following and empolying the inventive concept. Generally, but not as a limitation in any sense, an aqueous dispersion of the particulate materials could well be from 40% to 75% water, by weight, and the remainder from 60% down to 25% of the particulate reactants divided generally on a basis of four parts, by weight, of the oil-insoluble component to one part, by weight, of the oil-soluble component, as a rule of thumb but not as a limitation. Amounts of paper-coating adhesives are added as is necessary to adhere the particles to the base web to which it is applied, but, of course, adhesives that have a tendency to mask the particles physically should not be used, nor should any material be used as an adhesive in great excess of actual requirements, all of such factors tending to decrease the efficient use of the associated active particles because of a limitation of the exposed surface area. Here, again, the paper makers' and printers' skill and judgment play a part.

It has been mentioned that, if desired, some attapulgite or zeolite material may be used with the polymeric material, and that other materials of reactant nature can be employed to supplement the main pair of particulate reactants, for specific purposes. In this area of permissible substitutes or addition materials, silica gel has considerable standing because it is capable of instantaneously strongly coloring oil solutions of Crystal Violet Lactone (although the color is not persistent) and is an efficient oil receptor for oil-base ink. Where the particles of kaolin and acid polymeric material are slightly delayed in responsiveness because of their physical situation or condition in the support sheet, an amount of silica gel up to equal the amount of acid polymeric material may be used for its beneficent effect in the characteristics stated, but such use is not necessary to the practice of the invention in its simplest form. Silica gel is oil-insoluble but adsorbent thereof, may be finely ground, is colorless, disperses readily in water, and may be treated to increase its porosity and effectiveness as an acid. The polymeric-material-produced color of Crystal Violet Lactone is significantly more persistent than that produced by silica gel, and this must be considered in the use of the latter material.

The particle size of the reactants preferably should be from one to three microns in largest dimension, although considerable latitude at the expense of efficiency and economy is tolerable. For instance, if the grinding of materials to the most effective size is too expensive, their larger particle sizes are tolerable as long as sufficient color reaction per unit area of the record material is provided. On the other hand, finer grinding may result in more efficient use of materials on a weight basis, if not on a cost basis, and a lighter weight finished sheet may thereby be produced.

One of the chief considerations in selecting a preferred embodiment of the invention must be concerned with the manufacture of the record sheet, and as of now the best way to sensitize a sheet is to apply an aqueous slurry of the novel composition to a finished web of paper as it passes the coating station in a paper-making machine. Such a coating composition contains binder material and may contain defoamers and dispersing agents common to paper-coating practices, but their specification in no way is to mean a limitation of the practice of the invention in regard to either choice or necessity.

COATING COMPOSITIONS

Example I

| | Solids, parts/weight |
|---|---|
| Paper-coating kaolin (white) | 10 |
| Oil-soluble acid-reactant organic polymeric material | 1 |
| Binder as required, up to | 1 |
| Sufficient water to make a solids content of 25% to 60%. | |

Example II

| | |
|---|---|
| Paper-coating kaolin (white) | 3 |
| Attapulgite | 1 |
| Oil-soluble acid-reactant organic polymeric material | 1 |
| Binder as required, up to | 1 |
| Sufficient water to make a solids content of 25% to 60%. | |

Example III

| | |
|---|---|
| Paper-coating kaolin (white) | 3 |
| Silica gel | 1 |
| Oil-soluble acid-reactant polymeric material | 1 |
| Binder as required up to | 1 |
| Sufficient water to make a solids content of 25% to 60%. | |

Example IV

| | |
|---|---|
| Paper-coating kaolin (white) | 2 |
| Attapulgite | 1 |
| Silica gel | 1 |
| Oil-soluble acid-reactant polymeric materials | 1 |
| Minimum necessary binder, up to | 1 |
| Sufficient water to make a solids content of 25% to 60%. | |

EXAMPLE V

| | Permissible range | Preferred amount |
|---|---|---|
| (a) White kaolin of high kaolinite content as mined in Georgia and South Carolina, United States of America, the Cornwall district of Great Britain, Czechoslovakia, U.S.S.R., and Germany | 100.0 | 100.0 |
| (b) Phenolic resin | 15–40 | 28.0 |
| (c) Polyvinyl alcohol | 0.9–3.0 | 1.8 |
| (d) Minimum binder up to | 30.0 | 19.8 |
| (e) Sufficient water to make a solids content of 25% to 60%. Items (b) and (c) preferentially are ground together until the phenolic material has reached a particle size in the range of one to three microns; then the ground mixture is blended into a slurry of the kaolin and water; and, finally, the latex and starch binders in the chosen amount are added | | |

Example VI

| | Solids, parts/weight |
|---|---|
| (a) Kaolin (as specified) | 75–100 |
| (b) Silica gel | 0–25 |
| (c) Sodium silicate | 1.0–4.0 |
| (d) Polyvinyl alcohol | 0.9–3.0 |
| (e) Phenolic resin (as specified) | 15–40 |
| (f) Minimum binder up to | 30.0 |
| (g) Water to make 25% to 60% total solids content like Example V except disperse silica gel and kaolin in water containing sodium silicate. | |

Example VII

| | |
|---|---|
| (a) Attapulgite (attapulgus clay) | [1] 0–100 |
| (b) Kaolin (as specified) | [1] 0–100 |
| (c) Sodium silicate | 0–4 |
| (d) Oil-soluble acid-reacting phenolic resin | 15–40 |
| (e) Polyvinyl alcohol | 0.9–3.0 |
| (f) Minimum binder up to | 30.0 |
| (g) Water to make 25% to 60% solids content. | |

[1] At least 10.

Example VIII

| | |
|---|---|
| (a) Attapulgite (attapulgus clay) | 75–100 |
| (b) Silica gel | 0–25 |
| (c) Sodium silicate | 2–5 |
| (d) Oil-soluble acid-reacting phenolic resin | 15–40 |
| (e) Polyvinyl alcohol | 0.9–3.0 |
| (f) Minimum binder up to | 30.0 |
| (g) Water to make 20% to 35% solids content. | |

Example IX

| | |
|---|---|
| (a) Clay—one or more selected from the group consisting of kaolin, attapulgite, and bentonite, used singly or in combination | 100 |
| (b) Polymeric material—acid-reacting phenolic resin | 33–300 |
| (c) Binder | 20–112.5 |
| (d) Water to yield a total solids content of 4% to 31%. | |

It will be apparent that the ratio of the solids content of acid mineral to polymeric material content to the composition may vary greatly, as from 10 to 1 in Example I to 1 to 3 in Example IX. The examples pertain especially to coatings for paper. In filling paper furnish with these reactant materials, only such quantitative amounts should be used that will insure reaction with the ink and integrity of the paper web, such being determined empirically by the paper maker.

For coating non-fibrous web material, the application should be less wet, as there ordinarily will be no drying of the coating by absorption.

Although the best practice of the invention has been pointed out in the use of non-surface-active minerals, some use of them is tolerable and even desirable, the main point of achievement being to reduce the solid mineral requirements of the system to save coating weight, to supplant the adsorptive surface-active minerals of known colorless recording systems in substantial part by a non-adsorbent polymeric material of oil-soluble characteristics, to supply minerals relatively low in surface activity to assist in developing color in the component of permanence by an oxidation-reduction reaction, and to yield a liquid-solution color that will penetrate a porous support web such as paper.

The term "acid" used herein in any sense includes Lewis acids in general and is not restricted in any sense to any specialized definition.

In any of the systems, the end purpose may be to produce visually-sensed marks or electro-optically-sensed marks, and the inks containing the proper chromogenic materials must be used for the end in view. For instance, the colored form of Crystal Violet Lactone is not easily sensed by a "Xerox" type of copy machine, whereas it is strongly sensed visually. On the other hand, N-benzoyl auramine is easily sensed by a "Xerox" type of copy machine as well as visually.

The present invention has made it possible to produce, with a coating of two pounds dry solids per ream of paper 25 by 38 inches, better results than have been obtained by coatings of five pounds of dry solids when surface-active minerals such as attapulgite were used in predominance. This outstanding improvement is of enormous economic savings and is only one of the benefits provided by the invention.

The novel record material in that species which is coated on one surface may be coated on the rear surface with pressure-transfer material for use against an under sheet.

What is claimed is:

1. A record member carrying in a recording area a multitude of microfine solid particles of both an oil-soluble acid-reactant organic polymeric material and a colorless acid type of mineral in intimate juxtaposition in distribution and amount to form a visually continuous recording area, for developing color in normally colorless oil solutions of at least two kinds of chromogenic materials, at least one kind being colored by acid-base reaction with the polymeric material and the other kind being colored by oxidation-reduction reaction brought about after contact with the colorless acid mineral, the proportion of the polymeric material to the mineral being from 1 to 10–4 to 1 on a weight basis.

2. A record member carrying on a recording surface a multitude of microfine solid particles of both an oil-soluble acid-reactant organic polymeric material and kaolin clay in intimate juxtaposition in distribution and amount to form a visually continuous recording area, for developing color in normally colorless oil solutions of at least two kinds of chromogenic materials, one kind being colored by acid-base reaction with the polymeric material and the other kind being colored by oxidation-reduction reaction brought about after contact with the clay, the proportion of the polymeric material to the clay being from 1 to 10–4 to 1 on a weight basis.

3. A record member carrying on a recording surface a multitude of microfine solid particles of both an oil-soluble acid-reactant organic polymeric material and a material selected from the group consisting of kaolin clay, bentonite clay, and attapulgite clay in intimate juxtaposition in distribution and amount to form a visually continuous recording area, for developing color in normally colorless oil solutions of chromogenic materials of at least two kinds, one kind being colored by an acid-base reaction with the polymeric material, and the other kind being colored by an oxidation-reduction reaction, the proportion of the polymeric material to the clay being from 1 to 10–4 to 1 on a weight basis.

4. A paper sheet having a mixture of microfine particles of sensitizing material distributed therein to form a recording area, and being provided in an amount of from one to forty parts, by weight, of the mixture to fiber, to one to three of the mixture to weight of the fiber, consisting of two kinds of particles, one kind being of acid-reacting oil-soluble polymeric material and the other kind being non-oil-soluble acid clay-like mineral, the ratio of polymeric material to mineral ranging from 4 to 1, to 1 to 10.

5. A record member sensitized to receive and to convert to a colored state oily solutions of colorless chromogenic material applied to it, including, arranged on a supporting web, a multitude of microfine particles of water-insoluble material of two kinds arranged on a web in close intermingled juxtaposition to provide a visually continuous record surface area, one kind of particles being of oil-soluble polymeric material having free acid groups for taking part in acid-base reactions, and the other kind of particles being of a mineral structure having Lewis acid properties the proportion of the polymeric material to the mineral being from 1 to 10–4 to 1 on a weight basis.

6. The record member of claim 5 in which the particles on the web extend interiorly thereof.

7. The record member of claim 6 in which the web is paper.

8. The record member of claim 5 in which the web is paper.

9. The record member of claim 5 in which the web is porous to oily inks.

10. The record member of claim 5 in which the web is a continuous film of polymeric material.

11. The record member of claim 5 in which the mineral is paper-coating clay.

12. The record member of claim 11 in which the clay is kaolin.

13. The record member of claim 12 in which the clay is white kaolin.

No references cited.

MURRAY KATZ, Primary Examiner

U.S. Cl. X.R.

117—155